(12) United States Patent
Maceratini et al.

(10) Patent No.: US 6,507,166 B2
(45) Date of Patent: Jan. 14, 2003

(54) CONTROL DEVICE FOR A WIDE SPEED RANGE INDUCTION MACHINE, CARRYING OUT A CONTROL BASED UPON A FLUX ESTIMATION PERFORMED BY MEANS OF A LUENBERGER STATE OBSERVER, AND METHOD FOR POSITIONING THE EIGENVALUES OF SAID STATE OBSERVER

(75) Inventors: Roberto Maceratini, Asti (IT); Giovanni Barba, Turin (IT)

(73) Assignee: C.R.F. Societa Consortile per Azioni, Turin (IT)

( * ) Notice: Subject to any disclaimer, the term of this patent is extended or adjusted under 35 U.S.C. 154(b) by 0 days.

(21) Appl. No.: 09/865,892

(22) Filed: May 25, 2001

(65) Prior Publication Data

US 2002/0000783 A1 Jan. 3, 2002

(30) Foreign Application Priority Data

May 26, 2000 (IT) ........................................ TO20A0488

(51) Int. Cl.[7] ............................................... H02P 5/28
(52) U.S. Cl. ..................... 318/727; 318/432; 318/433; 318/434; 318/800; 318/807; 318/809; 318/811
(58) Field of Search ................................ 318/432, 433, 318/715, 727, 800, 807, 809, 811, 434

(56) References Cited

U.S. PATENT DOCUMENTS 5,296,793 A * 3/1994 Lang ............................ 318/715
5,296,794 A * 3/1994 Lang et al. ................... 318/715

OTHER PUBLICATIONS

A. Bellini, G. Figalli and G. Ulivi "Realization of a Bilinear Observer of the Induction Machine", Proceedings of the Second International Conference on Electrical Variable Speed Drives, 175–178, London, 1979.*

Y. Dote "Stabilization of Controlled Current Induction Motor Drive System via New nonlinear State Observer", IEEE Transaction on Industrial Electronics and Control Instrumentation, 27, 77–81, 1980.*

G.C. Verghese and S.R. Sanders "Observers for faster flux estimation in Induction Machines", Proceedings of the IEEE Power Electronics Specialists Conference, Toulouse, 1985.*

Song et al., *Sensorless Vector control of Induction Motor Using a Novel Reduced–Order Extended Luenberger Observer*: IEEE Transactions, vol. 3 of 5, Conf. 35, Oct. 8, 2000: (pp. 1828–1834).

European Search Report for Application No. 01112719.8 dated–2207 Jul. 8, 2002.

Kubota, H., et al., *DSP–Based Speed Adaptive Flux Observer of Induction Motor;* IEEE Transactions, vol. 29,2 Mar.–Apr. 1992 (pp. 344–348).

Kubota, H., et al., *New Adaptive Flux Observer of Induction Motor for Wide Speed of Rotation Range Motor Drives;* Industrial Electronics Society, 1990;IECON'90, 16th Annual conference of IEEE, 1999, (pp. 921–926), vol. 2.

* cited by examiner

Primary Examiner—Marlon T. Fletcher
Assistant Examiner—Tyrone Smith
(74) Attorney, Agent, or Firm—Conley, Rose & Tayon, P.C.

(57) ABSTRACT

The control device carries out a control of the induction machine based upon a flux estimation performed by means of a Luenberger state observer, the estimation error of which can be defined by means of a matrix having a plurality of eigenvalues, the magnitude of each of which is proportional to the magnitude of a respective pole of the induction machine, and the phase of each of which is rotated with respect to the phase of the corresponding pole of the induction machine by a given angle of rotation.

12 Claims, 5 Drawing Sheets

CONTROL DEVICE FOR A WIDE SPEED RANGE INDUCTION MACHINE, CARRYING OUT A CONTROL BASED UPON A FLUX ESTIMATION PERFORMED BY MEANS OF A LUENBERGER STATE OBSERVER, AND METHOD FOR POSITIONING THE EIGENVALUES OF SAID STATE OBSERVER

The present invention relates to a control device for a wide speed range induction machine, carrying out a control based upon a flux estimation performed by means of a Luenberger state observer.

The present invention moreover relates to a method for positioning the eigenvalues of a Luenberger state observer implemented in a control device for a wide speed range induction machine in order to perform an estimation of the flux of said induction machine.

BACKGROUND OF THE INVENTION

As is known, direct field-orientation control of induction machines calls for the knowledge of the components of the rotor flux of the induction machines themselves, which can either be measured directly using magnetic sensors or can be estimated on the basis of the values of the quantities present at the machine terminals.

In practical applications, however, recourse is almost exclusively had to the estimation of the rotor flux of the asynchronous machine, using an appropriate mathematical model, in so far as direct measurement presents numerous problems of a technical and economic nature.

One of the most interesting solutions for the estimation of the rotor flux of induction machines is represented by the known Luenberger state observer, which is based upon the dynamic equations of the induction machine itself and upon the measurement of speed in order to reconstruct the state of the induction machine in terms of stator current and rotor flux.

FIG. 1 shows, purely by way of non-limiting example, a general diagram of the circuit of the control of an induction machine 1, represented for reasons of simplicity by the symbol of a three-phase electric motor, said control being implemented on the basis of the flux estimation performed by means of a Luenberger state observer.

As is shown in FIG. 1, the control of the induction machine 1 envisages the use of a power driving device 2 which supplies to the induction machine 1 three control voltages, the so-called three phases of a three-phase system, and is controlled by a control device 4, typically implemented by means of a digital signal processor, commonly referred to as DSP.

In particular, the control device 4 carries out control of the induction machine 1 on the basis of the estimation of the rotor flux of the induction machine 1 performed by means of the aforesaid Luenberger state observer, and receives at input one or more reference signals, among which a reference speed signal indicating the desired speed of rotation of the induction machine 1, and a plurality of measurement signals indicating the values of quantities of the induction machine 1, among which the value of the effective speed of rotation of the induction machine 1 measured by means of a speed sensor (not shown) connected to the induction machine 1 and the values of two of the three phase currents absorbed by the induction machine 1 and measured by means of appropriate sensors (not shown) at the terminals of the induction machine 1.

FIG. 2 shows the block diagram of a part of the system with which the induction machine 1 and the Luenberger state observer used in the control device 4 are conventionally modelled from the control standpoint.

As shown in FIG. 2, the induction machine is schematically represented by a block 1 defined by a state vector x formed by the state variables of the induction machine 1, of which only one part is physically measured. The block 1 receives at input an input vector u representing input quantities supplied to the induction machine 1 (control voltages supplied by the power driving device) and generates at output a measured output vector y representing measured output quantities supplied to the induction machine 1 (absorbed currents), which, as is known, are selected from among the state variables contained in the state vector x.

As is known, then, the induction machine 1 is defined by the following variable-parameter linear differential state equations:

$$\begin{cases} \dot{x} = A(\omega)x + Bu \\ y = Cx \end{cases} \quad (1)$$

where:

A is known in the literature by the name of matrix of the induction machine or matrix of free evolution;

B is known in the literature by the name of input matrix; and

C is known in the literature by the name of output matrix, which enables generation of the measured output vector y starting from the state vector x, i.e., selection, from among all the state variables, of the output variables of the system.

The Luenberger state observer implemented by the control device 4 is instead schematically represented by a block 6 which receives at input the input vector u and supplies at output an estimated output vector $\tilde{y}$ representing the output quantities estimated by the Luenberger state observer 6, and an estimated state vector $\tilde{x}$ representing the state variables estimated by the Luenberger state observer 6.

The measured output vector y and the estimated output vector $\tilde{y}$ are then supplied at input to a block 8 which performs the subtraction and generates at output an error vector e supplied at input to the block 10 to carry out feedback.

As is known, then, the measured output vector y, together with the aforementioned reference signals, is supplied at input to a regulator block (not shown), which generates the aforesaid input vector u for regulating the currents and flux of the induction machine 1, in order to obtain the references required.

The Luenberger state observer applied to the dynamic model of the induction machine expressed as a function of the rotor flux and of the stator current (this being the most convenient form in so far as one of the state variables coincides with the output itself of the system, and the structure of the algorithm is thus simplified), represented on the stationary αβ reference system, is described by the following variable-parameter linear differential state equations and in complex form (the variables marked with the tilde refer to the variables estimated by the Luenberger state observer):

$$\begin{cases} \dot{\tilde{x}} = A(\omega)\tilde{x} + Bu - K(y - \tilde{y}) \\ \tilde{y} = C\tilde{x} \end{cases} \quad (2)$$

-continued $$A = \begin{bmatrix} -\frac{1}{\sigma}\left(\frac{R_s}{L_s} + \frac{(1-\sigma)R_r}{L_r}\right) & \frac{1-\sigma}{\sigma L_m}\left(\frac{R_r}{L_r} - j\omega\right) \\ L_m\frac{R_r}{L_r} & \left(-\frac{R_r}{L_r} + j\omega\right) \end{bmatrix} \quad (3)$$

$$B = \begin{bmatrix} \frac{1}{\sigma L_s} \\ 0 \end{bmatrix} \quad C = [1 \ 0]$$

$$\tilde{x} = \begin{bmatrix} \tilde{i}_s \\ \tilde{\lambda}_r \end{bmatrix} = \begin{bmatrix} \tilde{i}_{s\alpha} + j\tilde{i}_{s\beta} \\ \tilde{\lambda}_{r\alpha} + j\tilde{\lambda}_{r\beta} \end{bmatrix} \quad \begin{matrix} u = v_s = v_{s\alpha} + jv_{s\beta} \\ y = i_s = i_{s\alpha} + ji_{s\beta} \end{matrix} \quad (4)$$

$$K = \begin{bmatrix} k_{11} + jk_{12} \\ k_{21} + jk_{22} \end{bmatrix} = \begin{bmatrix} k_1 \\ k_2 \end{bmatrix} \quad (5)$$

where:
A, B and C have the meanings specified previously;
K is the feedback matrix of the Luenberger state observer;
$R_s$ is the stator resistance of the induction machine;
$R_r$ is the rotor resistance of the induction machine;
$L_m$ is the magnetization inductance of the induction machine;
$L_s$ is the stator inductance of the induction machine;
$L_r$ is the rotor inductance of the induction machine;
σ is the coefficient of dispersion of the induction machine defined as follows:

$$\sigma = 1 - \frac{L_m^2}{L_s L_r}$$

ω is the equivalent mechanical speed of rotation of the induction machine, corresponding to the mechanical speed of rotation multiplied by the pole torques;

$i_{s\,\alpha,\beta}$ are the components of the stator current in the stationary αβ reference system;

$\lambda_{r\,\alpha,\beta}$ are the components of the rotor flux in the stationary αβ reference system; and $v_{s\,\alpha,\beta}$ are the components of the stator voltage in the stationary αβ reference system.

Note that in equations (2) and (3) there appear the matrices A, B and C of the induction machine in so far as it is assumed that the parameters of the induction machine are known, and hence, in particular, that the matrix of the Luenberger state observer coincides with the matrix A of the induction machine.

To simplify the notation we put:

$$A = \begin{bmatrix} a_1 & -\beta(a_2 + j\omega) \\ a_3 & (a_2 + j\omega) \end{bmatrix} = \begin{bmatrix} a_1 & -\beta w \\ a_3 & w \end{bmatrix} \quad (6)$$

$$B = \begin{bmatrix} b_1 \\ 0 \end{bmatrix}$$

the coefficients introduced having been defined as follows:

$$a_1 = -\frac{1}{\sigma}\left(\frac{1}{T_s} + \frac{1-\sigma}{T_r}\right) \quad a_2 = -\frac{1}{T_r} \quad a_3 = -\frac{L_m}{T_r} \quad (7)$$

$$\beta = \frac{1-\sigma}{\sigma L_m} \quad w = a_2 + j\omega$$

Positioning of the eigenvalues of the Luenberger state observer, which are commonly referred to in the control field also by the term 'poles' (this term, however, is not altogether correct in so far as the system is time variant) is via the aforesaid feedback matrix K which multiplies the error vector given by the difference between the output vector measured and the output vector estimated by the Luenberger state observer.

In particular, typically each of the eigenvalues of the continuous-time Luenberger state observer is rendered proportional to a corresponding pole of the induction machine via the technique proposed in:

"New Adaptive Flux Observer of Induction Motor for Wide Speed of rotation Range Motor Drives", Kubota, H., Matsuse, K., Nakano, T., Industrial Electronics Society, 1990. IECON '90., 16th Annual Conference of IEEE, 1990, pp. 921–926 Vol. 2; and in "DSP-based Speed Adaptive Flux Observer of Induction Motor", Kubota, H., Matsuse, K., Nakano, T., Industry Applications, IEEE Transactions, Vol. 29, 2 March–April 1993 pp. 344–348.

This technique enables real-time updating of the coefficients of the feedback matrix K with simple algebraic operations.

In detail, the aforesaid technique envisages that, in the conventional representation of the poles and eigenvalues in magnitude and phase, the magnitudes of the eigenvalues of the continuous-time Luenberger state observer are rendered proportional to the magnitudes of the corresponding poles of the induction machine, and that the phases of the eigenvalues of the continuous-time Luenberger state observer remain unvaried with respect to those of the corresponding poles of the induction machine, i.e., in other words, they are exactly equal to the phases of the corresponding poles of the induction machine.

If, instead, the conventional partly real and partly imaginary representation is considered, the aforesaid technique envisages that the real parts and the imaginary parts of the eigenvalues of the continuous-time Luenberger state observer are rendered proportional to the real parts and, respectively, to the imaginary parts of the corresponding poles of the induction machine.

According to said technique, moreover, with the assumption made above, the matrix $A_o$ known in the literature by the name of matrix of the estimation error of the Luenberger state observer (often, for reasons of simplicity, also referred to, albeit somewhat improperly, as matrix of the Luenberger state observer), is:

$$A_o = \quad (8)$$

$$A - KC = \begin{bmatrix} a_1 & -\beta w \\ a_3 & w \end{bmatrix} - \begin{bmatrix} k_1 \\ k_2 \end{bmatrix}[1 \ 0] = \begin{bmatrix} (a_1 - k_1) & -\beta w \\ (a_3 - k_2) & w \end{bmatrix}$$

whence the terms of the so-called characteristic polynomial of the Luenberger state observer may be immediately obtained as follows:

$$\begin{cases} p_{1o} + p_{2o} = a_1 - k_1 + jw \\ p_{1o}p_{2o} = w[(a_1 - k_1) + \beta(a_3 - k_2)] \end{cases} \quad (10)$$

and hence the analytical expression of the feedback matrix K, which makes it possible to render the eigenvalues of the matrix $A_o$, often referred to, for reasons of simplicity, by the term eigenvalues of the Luenberger state observer, proportional to the poles of the induction machine, as a function of the machine parameters and of the speed:

$$\begin{cases} k_{11} = (1-\alpha)(a_1 + a_2) \\ k_{12} = (1-\alpha)\omega \\ k_{21} = (1-\alpha^2)(a_3 + \gamma a_1) - \gamma k_{11} \\ k_{22} = -\gamma k_{12} \end{cases} \quad \gamma = \frac{1}{\beta} = \frac{\sigma L_m}{1-\sigma} \quad (11)$$

The coefficient α in equation (11) expresses the factor of proportionality between the eigenvalues of the Luenberger state observer and the poles of the induction machine and makes it possible to position the eigenvalues of the Luenberger state observer with one degree of freedom.

FIG. 3 shows the trajectories of the poles of the induction machine and of the eigenvalues of the Luenberger state observer on the plane of the Laplace variable s as a function of the speed of rotation of the induction machine, for a value of α equal to 2.

It may be noted that for each value of the speed of rotation the eigenvalues of the Luenberger state observer are displaced along radial directions, and the entire trajectory or path is amplified by a scale factor, modifying the natural frequency of the eigenvalues but not their damping.

The values given in the graph of FIG. 3 refer to a three-phase electric motor characterized by the following parameters:

| | | | |
|---|---|---|---|
| $R_s$ | 0.0445 W | Rated voltage | 104 V |
| $R_r$ | 0.0470 W | Rated current | 55 V |
| $L_m$ | 3.9 mH | Rated speed | 3000 r.p.m. |
| $L_s$ | 4.1 mH | Rated frequency | 100 Hz |
| $L_r$ | 4.1 mH | Number of poles | 4 |
| $\sigma$ | 0.088 | Rated power | 7.5 kW |

Discrete-time implementation of the Luenberger state observer on digital signal processors requires the calculation of the exponential matrix of a variable-parameter fourth-order system, which cannot be performed in real time in an exact way.

Generally, on-line updating of the model of the Luenberger state observer is preferred, using approximate formulas of the exponential matrix which are obtained by truncating the Taylor series at the first or second term.

The algorithms that use the first term of the Taylor series require a minimal computational effort but prove unstable typically beyond 4000 r.p.m. In addition, the approximations introduced in the implementation of the Luenberger state observer in digital form condition the precision achievable in the estimation of the state variables; consequently, in order to enable stable and proper operation over a wide range of speeds it is necessary to use second-order models, the implementation of which, however, entails a computational effort which is approximately four times greater.

Other solutions proposed envisage, instead, an interpolation between various discrete-time models calculated for certain speed values and stored in a memory table, but these techniques involve a computational effort approximately twice as great, which limits the sampling frequency and the maximum speed of operation of the induction machine.

Various other techniques for positioning the eigenvalues of the Luenberger state observer, different from the one described above in which the eigenvalues of the continuous-time Luenberger state observer are rendered proportional to those of the induction machine, have then been proposed to extend the range of stability of the Luenberger state observer. All these techniques, however, give rise to feedback matrices K that in general have somewhat complex analytical formulations and comprise operations of raising to a power, operations of division, trigonometric relations, etc., the execution of which always requires a considerable computational effort.

SUMMARY OF THE INVENTION

The aim of the present invention is therefore to provide a method for positioning the eigenvalues of the Luenberger state observer and to implement a control device for an induction machine that carries out a control based upon the flux estimation performed by means of the Luenberger state observer, said method and said control device making it possible to extend the range of stability of the Luenberger state observer considerably, using just the first-order approximation of the Taylor series of the exponential matrix, so involving minimal computational effort and thus enabling implementation thereof on processors having contained performance and cost.

According to the present invention there is provided a control device for a wide speed range induction machine, carrying out a control based upon a flux estimation performed by means of a Luenberger state observer, as defined in claim 1.

Moreover, according to the present invention there is provided a method for positioning the eigenvalues of a Luenberger state observer implemented in a control device for a wide speed range induction machine to perform an estimation of the flux of said induction machine, as defined in claim 7.

BRIEF DESCRIPTION OF THE DRAWINGS

For a better understanding of the present invention a preferred embodiment thereof is now described, purely by way of non-limiting example and with reference to the attached drawings, in which.

DETAILED DESCRIPTION OF THE INVENTION

The present invention is based upon the principle of generalizing the technique of purely proportional positioning of the eigenvalues of the Luenberger state observer described previously, in which, as has been said, the eigenvalues of the continuous-time Luenberger state observer are rendered proportional, both in the real part and in the imaginary part, and consequently in the magnitudes, to the corresponding poles of the induction machine.

In particular, the present invention is based upon the principle of imposing the condition that the eigenvalues of the Luenberger state observer, designated by $p_o$, are proportional to those of the induction machine, designated by p, via a complex coefficient g defined in magnitude and phase as follows:

$$p_o = gp \quad (12)$$

$$g = \alpha e^{jpullout;zu324500.003} = \alpha(\cos \vartheta + j\sin\vartheta) = (g_r + jg_i) \quad (13)$$

Figure 1:
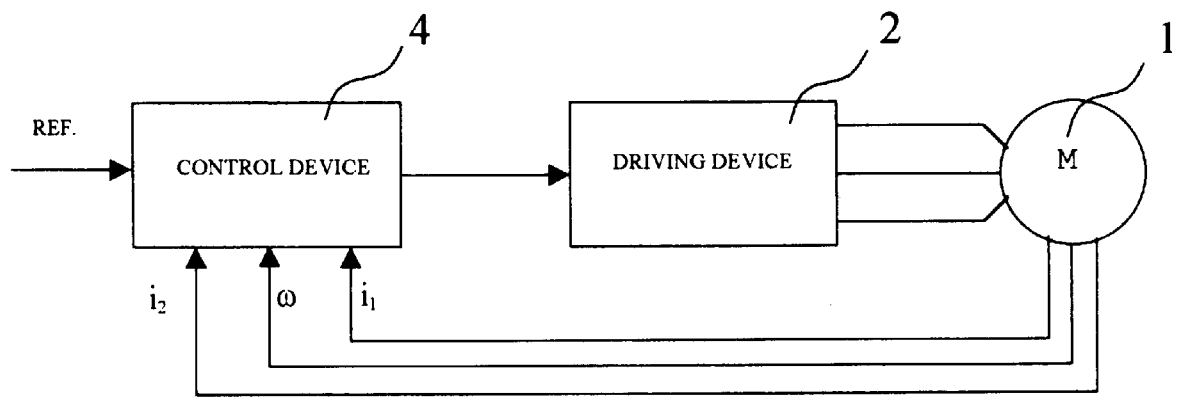
FIG. 1 shows a general circuit diagram used for the control of an induction machine.
Figure 2:
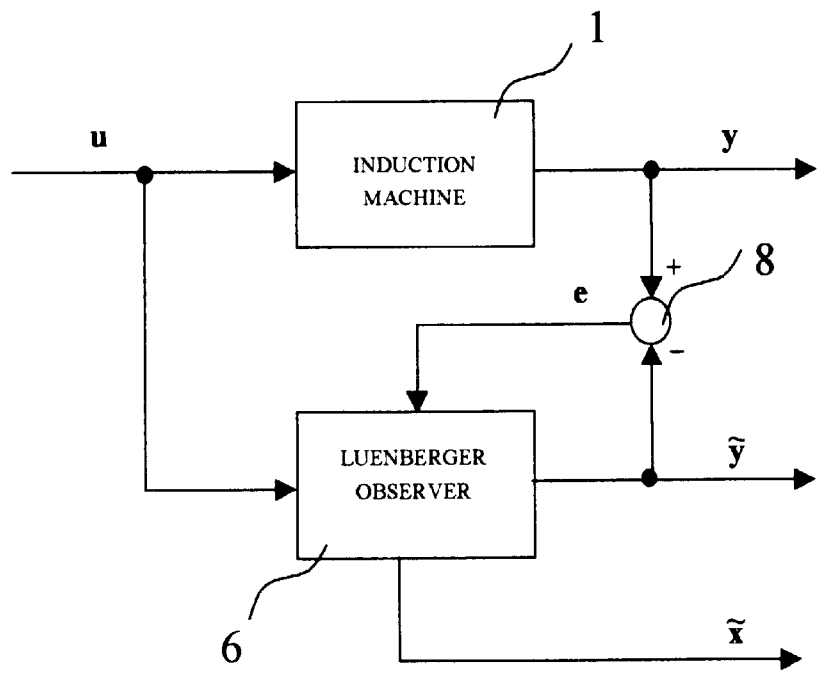
FIG. 2 shows the block diagram of the system with which the induction machine and the corresponding Luenberger state observer are conventionally modelled from the control standpoint.
Figure 3:
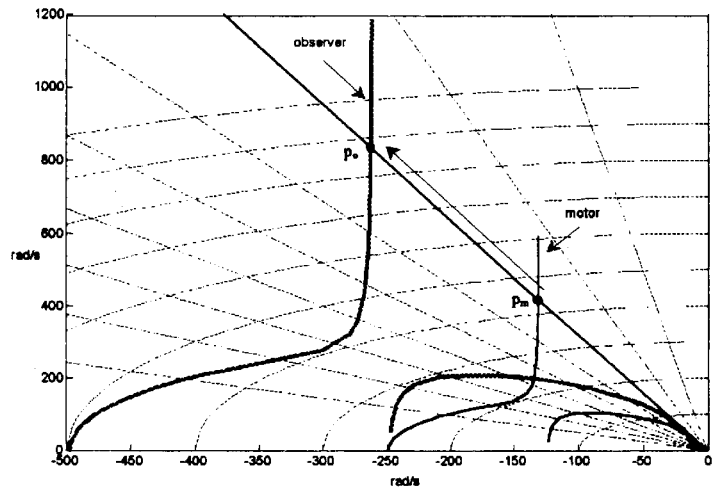
FIG. 3 shows the trajectories of the poles of the induction machine and of the eigenvalues of the Luenberger state observer on the plane of the Laplace variable s as a function of speed, calculated for a factor of proportionality of the eigenvalues equal to 2, according to the conventional technique.
Figure 4:
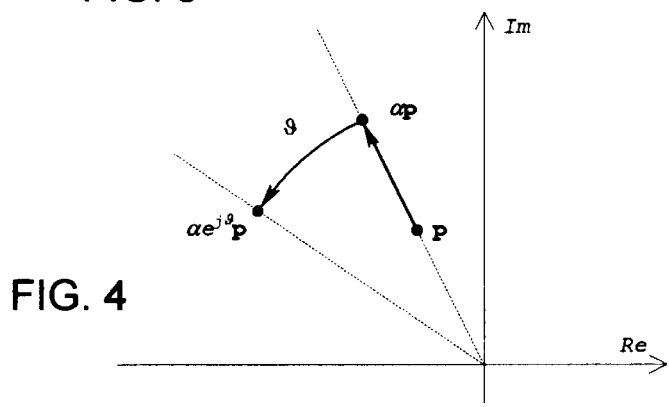
FIG. 4 shows the technique for positioning the eigenvalues of the Luenberger state observer according to the present invention.

As compared to the purely proportional positioning according to the prior art described previously, relation (13) also determines a rotation of the eigenvalues on the complex plane; that is, in other words, it does not only cause the magnitudes of the eigenvalues of the Luenberger state observer to be proportional to the magnitudes of the corresponding poles of the induction machine, but also the phases of the eigenvalues of the Luenberger state observer to be rotated by an angle $\vartheta$ with respect to those of the corresponding poles of the induction machine, as shown in FIG. 4.

Furthermore, conveniently the angle of rotation $\vartheta$ of the phases of the eigenvalues of the Luenberger state observer with respect to the phases of the corresponding poles of the induction machine is less than or equal to 45°.

With the assumptions made above, substituting the transformation (12) and (13) into equation (9) we obtain the relation between the coefficients of the polynomial of the Luenberger state observer and the coefficients of the system $$P_o(s) = s^2 - \alpha e^{jpullout;zu324500.003}(p_1+p_2)s + \alpha^2 e^{2jpullout;zu324500.003}(p_1+p_2) \quad (14)$$

To calculate the expression of the feedback matrix K, the coefficients of the polynomial (14) and of the polynomial (10) are equated term by term, and the following expressions are thus obtained:

$$\begin{cases} k_1 = (1 - \alpha e^{j\vartheta})(a_1 + jw) \\ k_2 = (1 - \alpha^2 e^{j2\vartheta})(a_3 + \gamma a_1) - \gamma k_1 \end{cases} \quad (15)$$

The expressions (15) contain the synthesis equations of the feedback matrix K for rotation of the eigenvalues. Dismembering the real part from the imaginary part we obtain the following calculation expressions for the individual coefficients $k_{ij}$:

$$\begin{cases} k_{11} = (1 - g_r)(a_1 + a_2) + g_i\omega \\ k_{12} = (1 - g_r)\omega - g_i(a_1 + a_2) \\ k_{21} = (1 - g_r^2 + g_i^2)(a_3 + \gamma a_1) - \gamma k_{11} \\ k_{22} = -\gamma k_{12} + 2g_r g_i(a_3 + \gamma a_1) \end{cases} \quad (16)$$

Via the gains $g_r$ and $g_i$ it is possible to position the eigenvalues with two degrees of freedom. Note that for $g_i=0$ the expressions (16) reduce to the expressions (11), which correspond to the purely proportional correction, i.e., without phase rotation.

Figure 5:
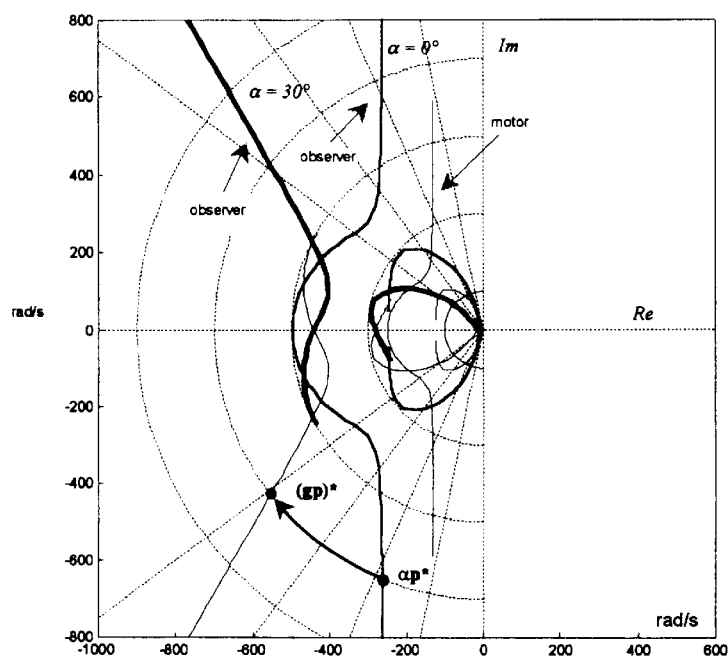
FIG. 5 shows the trajectories of the eigenvalues of the Luenberger state observer according to the present invention on the plane of the Laplace variable s as a function of speed.

For a comparison with the technique of purely proportional positioning described previously, FIG. 5 shows the trajectories of the eigenvalues for a factor $\alpha$ of 2 and an angle $\vartheta$ of 30°, in which the scales are identical for the two axes.

As may be noted, the complete locus of the roots is obtained by reflection of the trajectory defined on the positive half-plane of the imaginary axis. In fact, the conjugated eigenvalues automatically undergo an inverse rotation with respect to what is defined in expression (13); namely:

$$p_o = \alpha e^{jpullout;zu324500.003}p \Rightarrow (p_o)^* = (\alpha e^{jpullout;zu324500.003}p)^* = \alpha e^{-jpullout;zu324500.003}(p)^* \quad (17)$$

In order to obtain symmetry of operation, it is, however, necessary to change the sign of the coefficient $g_i$ in the case of negative speeds.

The technique according to the present invention enables deformation of the trajectories of the eigenvalues of the Luenberger state observer by acting separately on the natural frequency and on damping. The natural frequency is, in fact, determined solely by the scale factor a, and damping by the angle of rotation $\vartheta$.

Figure 6:
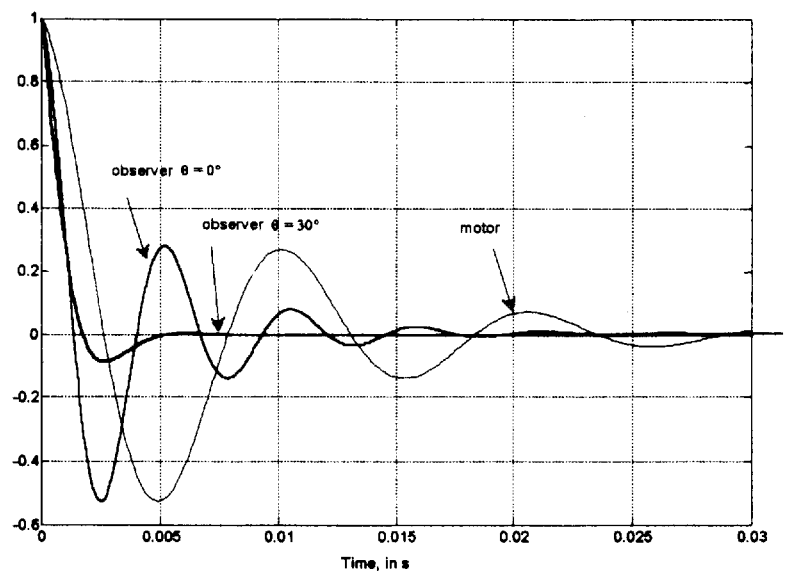
FIG. 6 shows the free responses associated to the eigenvalues of greater magnitude of the Luenberger state observer according to the present invention, at the rated speed.

FIG. 6 shows the free responses associated to the eigenvalues of the Luenberger state observer of greater magnitude at the rated speed and with a factor of proportionality $\alpha$ of 2, in the traditional case of purely proportional positioning and according to the present invention with rotation of the eigenvalues.

It may be noted that the technique according to present invention makes it possible to render the dynamic response of the Luenberger state observer more damped.

As regards, instead, the stability of the discrete-time Luenberger state observer, the discrete representation of the Luenberger state observer consists of a system of linear difference equations, in which at each cycle the estimation is made on the basis of the information of the previous step; namely:

$$\begin{cases} \tilde{x}_{k+1|k} = A_d \tilde{x}_{k|k-1} + B_d u_k + K_d(y_k - \tilde{y}_{k|k-1}) \\ \tilde{y}_{k|k-1} = C\tilde{x}_{k|k-1} \end{cases} \quad (18)$$

where $A_d$, $B_d$ and $K_d$ designate the matrices of the discrete-time model that are obtained starting from the matrices A, B and K already defined for the continuous-time model.

The discrete-time algorithm of the system is obtained using the backward Euler technique, which is equivalent to approximating the matrix exponential with the first term of the Taylor series; namely:

$$A_d = e^{AT_c} = I + AT_c + \frac{1}{2}A^2 T_c^2 + \ldots \Rightarrow \begin{cases} A_d = I + AT_c \\ B_d = BT_c \\ K_d = KT_c \end{cases} \quad (19)$$

In these conditions, the model of the Luenberger state observer is expressed by the following system of equations:

$$\begin{cases} \tilde{x}_{k+1|k} = (I + AT_c)\tilde{x}_{k|k-1} + BT_c u_k + KT_c(y_k - \tilde{y}_{k|k-1}) \\ \tilde{y}_{k|k-1} = C\tilde{x}_{k|k-1} \end{cases} \quad (20)$$

Figure 7:
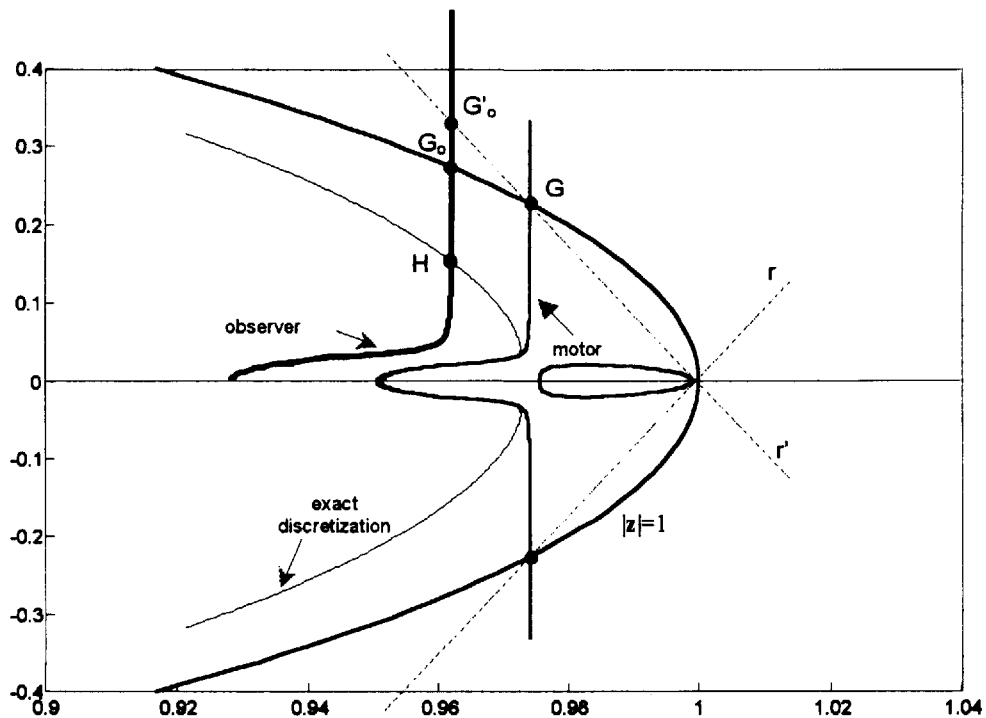
FIG. 7 shows the trajectories of the eigenvalues, in the plane of the complex variable z, of the discrete Luenberger state observer according to the traditional technique, obtained with the first-order approximation of the Taylor series.

In the case considered by way of example, the locus of the roots of the discrete system obtained with first-order approximation is given in FIG. 7, for a sampling time $T_c$ of 200 μs.

As the speed of rotation increases, the trajectory is seen to depart considerably from the exact trajectory, and the eigenvalues approach the unit circle. The limit value of rotor speed corresponding to the point G, which is the limit of the area of stability, can be calculated with a fair degree of approximation from the equation:

$$\omega_{olim} \approx \frac{1}{\alpha T_c}\sqrt{1 - \left[1 + \frac{\alpha T_c}{2}(a_1 + a_2)\right]^2} \quad (22)$$

The eigenvalues of the Luenberger state observer are displaced along the directions r and r'; consequently, for values of a greater than unity, instability is reached in the point Go, for speeds always lower than what was calculated in the point G. The theoretical limit speed as a function of the gain a is calculated with the following formula:

$$\omega_{ohm} \approx \frac{1}{\alpha T_c}\sqrt{1 - \left[1 + \frac{\alpha T_c}{2}(a_1 + a_2)\right]^2} \quad (22)$$

For example, if a factor of proportionality of the eigenvalues of 2 is chosen, the limit speed is $$\omega_{olim}(\alpha=2) \approx 3700 \text{ r.p.m.} \quad (23)$$

The value thus calculated is optimistic, in the sense that the maximum speed of rotation allowable must necessarily be lower in order to guarantee a certain margin of stability. The range of operation of the Luenberger state observer is hence found to be markedly limited.

The technique proposed for positioning the eigenvalues makes it possible to extend the range of stability considerably, without this entailing any additional computational cost.

Figure 8:
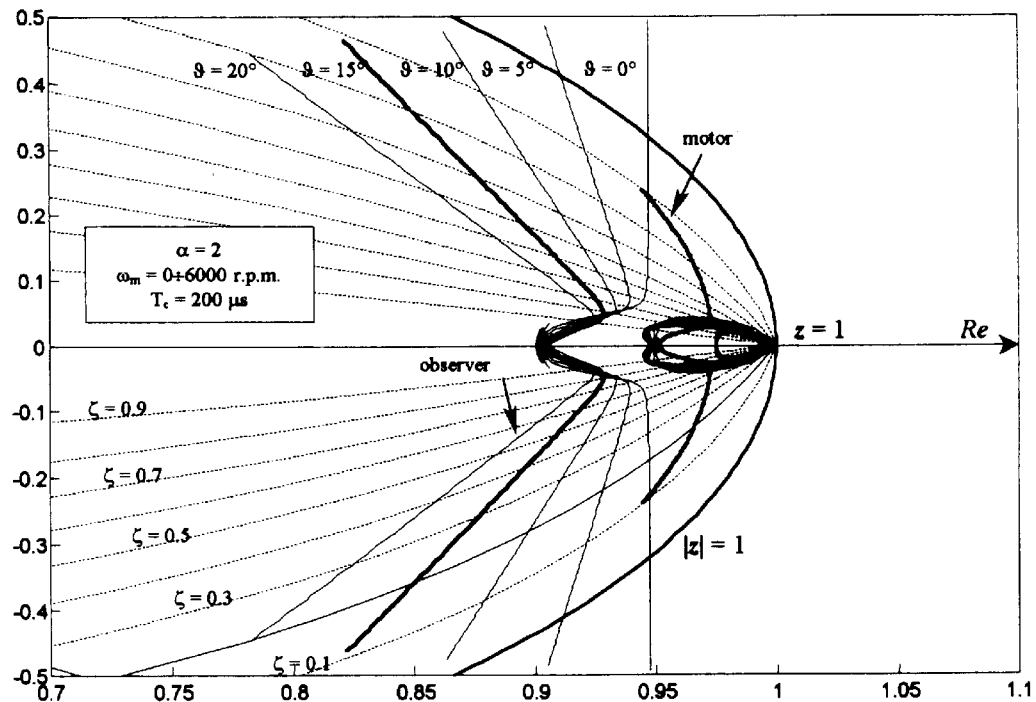
FIG. 8 shows the locus of the roots of the Luenberger state observer in the plane of the complex variable z, calculated for a factor of proportionality of the magnitudes of the eigenvalues equal to 2 and plotted for various values of the angle of rotation and in a range of speed of rotation of the induction machine of between 0 and 6000 r.p.m.

FIG. 8 gives on the plane of the complex variable z the locus of the roots of the Luenberger state observer, calculated for a factor of proportionality of the magnitudes of the eigenvalues equal to 2. The trajectories of the eigenvalues have been plotted for different values of the angle of rotation in a range of speed of rotation between 0 and 6000 r.p.m., i.e., twice the rated value of the motor.

It may be noted that an angle of rotation of 15 degrees is sufficient to guarantee stability over the entire range, obtaining at the maximum speed a damping of approximately 0.2. In the case of purely proportional positioning, the speed limit is instead close to 3700 r.p.m.

Figure 9:
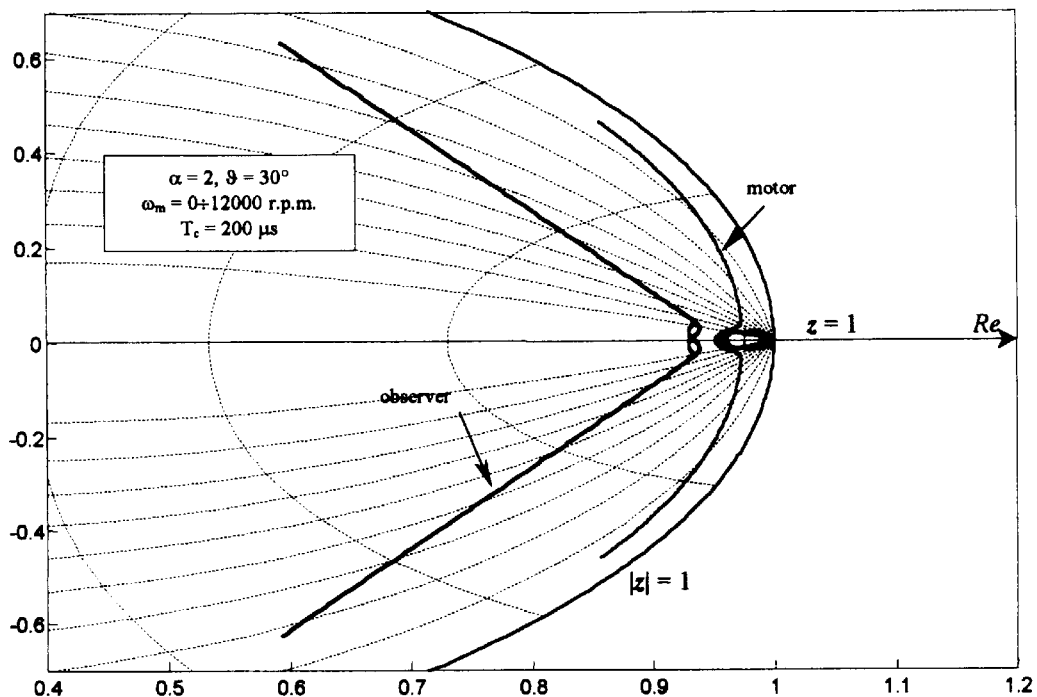
FIG. 9 shows the locus of the roots of the Luenberger state observer in the plane of the complex variable z, calculated for a factor of proportionality of the magnitudes of the eigenvalues equal to 2 and an angle of rotation of 30 degrees, in a range of speed of rotation of the induction machine of between 0 and 12000 r.p.m.

FIG. 9 shows the locus of the roots of the Luenberger state observer over a range of between 0 and 12000 r.p.m.. The plots of the trajectories of the eigenvalues show that, with the proposed positioning of the eigenvalues, it is possible to extend by a factor of three the range of stability of the Luenberger state observer based upon first-order approximation, as compared to the conventional technique.

Figure 10:
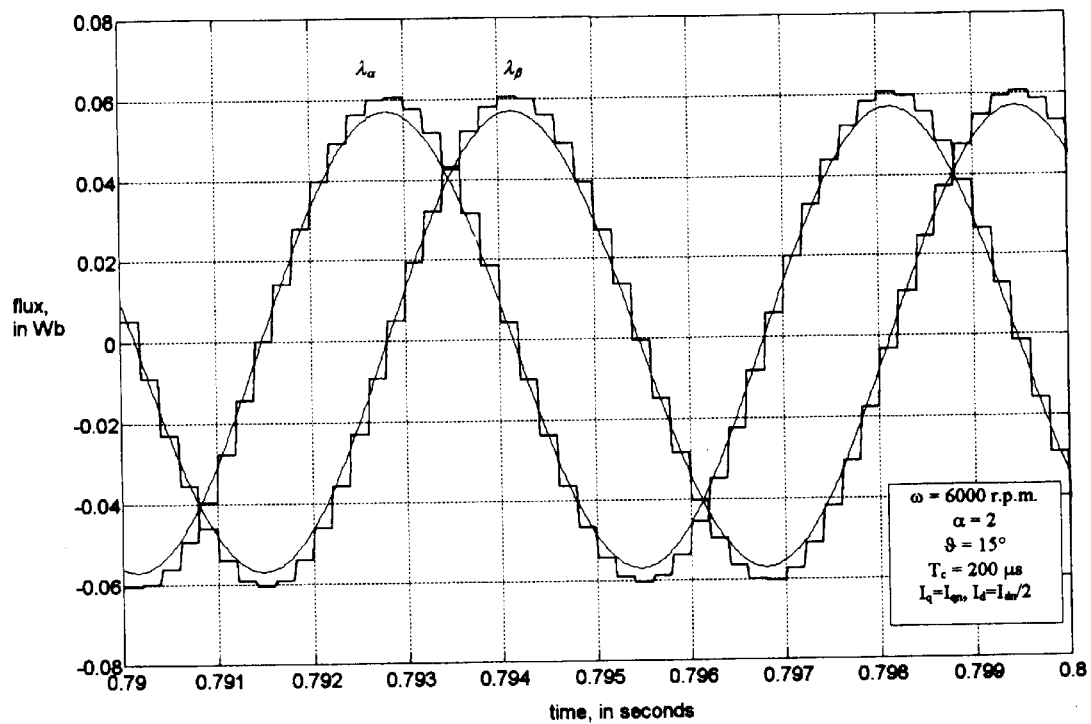
FIGS. 10 and 11 show the results of a numeric simulation in which the Luenberger state observer was set in parallel with the motor, which was controlled using the exact information of the angle of rotor flux.
Figure 11:
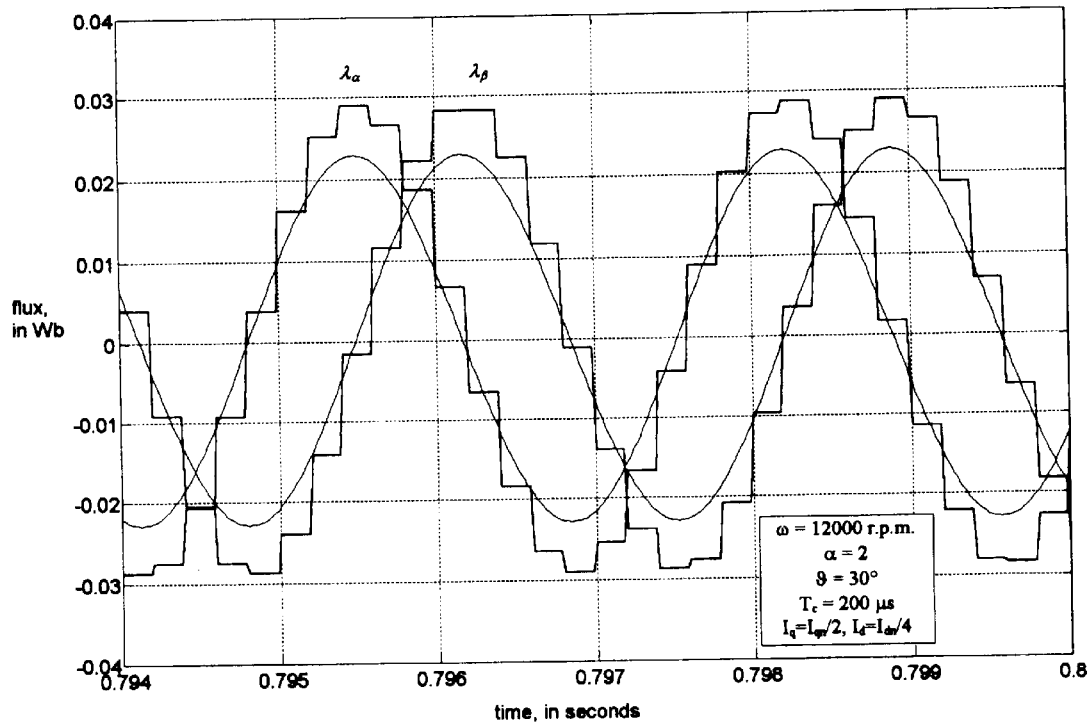

Finally, FIGS. 10 and 11 present the results obtained from a numerical simulation using MATLAB SIMULINK, in which the Luenberger state observer was set in parallel with the motor, which was controlled using the exact information of the rotor-flux angle.

The estimation algorithm was based upon the first-order discrete model with 200-μs sampling time, implemented by means of a MATLAB S-FUNCTION written in C language with floating-point variables and machine precision. The system for controlling the current was obtained with two digital controllers of the integral-proportional type. The inverter and the current and voltage measurements were considered altogether ideal.

The system was implemented on a DSP Texas Instrument TMS320F240 processor with fixed point and 20-MHz clock frequency. The total time required for execution by the Luenberger state observer, including the updating of the coefficients of the feedback matrix, was less than 30 μs.

At the speed of 6000 r.p.m. it may be noted that the flux estimated (step-like pattern) is close to the actual one (continuous pattern), both as regards the magnitude and as regards the phase. The small errors found in the magnitude in steady-state conditions may be put down mainly to the model approximations introduced by the discretization with truncation at the first term of the Taylor series, and these errors cannot be eliminated.

At the speed of 12000 r.p.m. the error in the magnitude is slightly greater than in the case at 6000 r.p.m., but the angle is still estimated with sufficient precision.

It may therefore be concluded that the technique proposed for positioning the eigenvalues of the Luenberger state observer makes it possible to extend the range of stability of the discrete-time algorithm by a factor of three as compared to the conventional method, until a speed of 12000 r.p.m. is reached, substantially contributing also to an improvement in the damping of the dynamic response.

The computational requirements are minimal, in so far as repeated updatings of the state equations, readings in memory tables, and complex algebraic operations are not required; consequently, it is possible to achieve high sampling frequencies even using low-cost processors.

What claimed is:

1. A control device (4) for a wide speed range induction machine (1), carrying out a control based upon a flux estimation performed by means of a state observer (6), said induction machine (1) having a plurality of poles (p), and said state observer (6) having an estimation error definable by means of a matrix ($A_o$) having a plurality of eigenvalues ($p_o$), the magnitude of each of the eigenvalues ($p_o$) of said estimation-error matrix ($A_o$) being correlated to the magnitude of a corresponding pole (p) of said induction machine (1); characterized in that the phase of each of the eigenvalues ($p_o$) of said estimation-error matrix ($A_o$) is modified with respect to the phase of the corresponding pole (p) of said induction machine (1) according to a pre-set relation.

2. The control device according to claim 1, characterized in that the phase of each of the eigenvalues ($p_o$) of said estimation-error matrix ($A_o$) is rotated with respect to the phase of the corresponding pole (p) of said induction machine (1) by a given angle of rotation (9).

3. The control device according to claim 2, characterized in that said angle of rotation (9) is less than or equal to 45°.

4. The control device according to claim 1, characterized in that the magnitude of each of the eigenvalues ($p_o$) of said estimation-error matrix ($A_o$) is proportional to the magnitude of the corresponding pole (p) of said induction machine (1).

5. The control device (4) for a wide speed range induction machine (1), carrying out a control based upon a flux estimation perfomed by means of a state observer (6), said induction machine (1) having a plurality of poles (p), and said state observer (6) having an estimation error definable by means of a matrix ($A_o$) having a plurality of eigenvalues ($p_o$), the magnitude of each of the eigenvalues ($p_o$) of said estimation-error matrix ($A_o$) being correlated to the magnitude of a corresponding pole (p) of said induction machine (1); characterized in that the phase of each of the eigenvalues ($p_o$) of said estimation-error matrix ($A_o$) is modified with respect to the phase of the corresponding pole (p) of said induction machine (1) according to a pres-set relation, characterized in that the eigenvalues ($p_o$) of said estimation-error matrix ($A_o$) are correlated to the poles ($p_o$) of said induction machine (1) according to the following relation:

$$p_o = g \cdot p \quad g = \alpha \cdot e^{j\zeta}$$

where:

p are the poles of said induction machine;

$p_o$ are the eigenvalues of said estimation-error matrix ($A_o$);

g is a complex coefficient of proportionality between the poles (p) of the induction machine (1) and the corresponding eigenvalues ($p_o$) of the estimation-error matrix ($A_o$);

α is the magnitude of the complex coefficient of proportionality (g) and represents the factor of proportionality between the magnitudes of the poles (p) of the induction machine (1) and the magnitudes of the corresponding eigenvalues ($p_o$) of the estimation-error matrix ($A_o$); and ζ is the phase of the complex coefficient of proportionality and represents the angle of rotation by which the phases of the eigenvalues ($p_o$) of the estimation-error matrix ($A_o$) are rotated with respect to the phases of the corresponding poles (p) of the induction machine (1).

6. The control device according to claim 5, characterized in that said estimation-error matrix ($A_o$) is a function of a feedback matrix (K), the elements of which are defined by the following relations:

$$\begin{cases} k_{11} = (1 - g_r)(a_1 + a_2) + g_i \omega \\ k_{12} = (1 - g_r)\omega - g_i(a_1 + a_2) \\ k_{21} = (1 - g_r^2 + g_i^2)(a_3 + \gamma a_1) - \gamma k_{11} \\ k_{22} = -\gamma k_{12} + 2 g_r g_i (a_3 + \gamma a_1) \end{cases} \quad \gamma = \frac{1}{\beta} = \frac{\sigma L_m}{1 - \sigma}$$

where:

$k_{ij}$ are the elements of the feedback matrix (K);

ω is the speed of rotation of said induction machine (1);

$a_i$ are elements of a matrix (A) of said induction machine;

$L_m$ is the magnetization inductance of said induction machine (1); and

σ is the coefficient of dispersion of said induction machine (1).

7. A method for positioning the eigenvalues ($p_o$) of a state observer (6) implemented in a control device (4) for a wide speed range induction machine (1) to perform an estimation of the flux of said induction machine (1), said induction machine (1) having a plurality of poles (p), and the estimation error of said state observer (6) being definable by means of a matrix ($A_o$) having a plurality of eigenvalues ($p_o$), said method comprising the step of correlating the magnitude of each of the eigenvalues ($p_o$) of said estimation-error matrix ($A_o$) to the magnitude of a corresponding pole (p) of said induction machine (1); said method being characterized in that it further comprises the step of modifying the phase of each of the eigenvalues ($p_o$) of said estimation-error matrix ($A_o$) with respect to the phase of the corresponding pole (p) of said induction machine (1) according to a pre-set relation.

8. The method for positioning eigenvalues according to claim 7, characterized in that the phase of each of the eigenvalues ($p_o$) of said estimation-error matrix ($A_o$) is rotated with respect to the phase of the corresponding pole (p) of said induction machine by a given angle of rotation (9).

9. The method for positioning eigenvalues according to claim 8, characterized in that said angle of rotation (9) is less than or equal to 45°.

10. The method for positioning eigenvalues according to claim 7, characterized in that the magnitude of each of the eigenvalues ($p_o$) of said estimation-error matrix ($A_o$) is proportional to the magnitude of the corresponding pole (p) of said induction machine (1).

11. The method for positioning the eigenvalues ($p_o$) of a state observer (6) implemented in a control device (4) for a wide speed range induction machine (1) to perform an estimation of the flux of said induction machine (1), said induction machine (1) having a plurality of poles (p), and the estimation error of said state observer (6) being definable by means of a matrix ($A_o$) having a plurality of eigenvalues ($p_o$), said method comprising the step of correlating the magnitude of each of the eigenvalues ($p_o$) of said estimation-error matrix ($A_o$) to the magnitude of a corresponding pole (p) of said induction machine (1); said method being characterized in that it further comprises the step of modifying the phase of each of the eigenvalues ($p_o$) of said estimation-error matrix ($A_o$) with respect to the phase of the corresponding pole (p) of said induction machine (1) according to a pre-set relation, characterized in that the eigenvalues ($p_o$) of said estimation-error matrix ($A_o$) are correlated to the poles (p) of said induction machine (1) according to the following relation:

$$p_o = g \cdot p \quad g = \alpha \cdot e^{j\zeta}$$

where:

p are the poles of said induction machine;

$p_o$ are the eigenvalues of said estimation-error matrix ($A_o$);

g is a complex coefficient of proportionality between the poles (p) of the induction machine (1) and the corresponding eigenvalues ($p_o$) of the estimation-error matrix ($A_o$);

α is the magnitude of the complex coefficient of proportionality (g) and represents the factor of proportionality between the magnitudes of the poles (p) of the induction machine (1) and the magnitudes of the corresponding eigenvalues ($p_o$) of the estimation-error matrix ($A_o$); and ζ is the phase of the complex coefficient of proportionality (g) and represents the angle of rotation by which the phases of the eigenvalues ($p_o$) of the estimation-error matrix ($A_o$) are rotated with respect to the phases of the corresponding poles (p) of the induction machine (1).

12. The method for positioning eigenvalues according to claim 11, characterized in that said estimation-error matrix ($A_o$) is a function of a feedback matrix (K) the elements of which are defined by the following relations:

$$\begin{cases} k_{11} = (1 - g_r)(a_1 + a_2) + g_i\omega \\ k_{12} = (1 - g_r)\omega - g_i(a_1 + a_2) \\ k_{21} = (1 - g_r^2 + g_i^2)(a_3 + \gamma a_1) - \gamma k_{11} \\ k_{22} = -\gamma k_{12} + 2g_r g_i(a_3 + \gamma a_1) \end{cases} \quad \gamma = \frac{1}{\beta} = \frac{\sigma L_m}{1 - \sigma}$$

where:

$k_{ij}$ are the elements of the feedback matrix (K);

ω is the speed of rotation of said induction machine (1);

$a_i$ are elements of a matrix (A) of the induction machine;

$L_m$ is the magnetization inductance of said induction machine (1); and

σ is the coefficient of dispersion of said induction machine (1).

* * * * *

UNITED STATES PATENT AND TRADEMARK OFFICE
CERTIFICATE OF CORRECTION

PATENT NO.     : 6,507,166 B2                                                   Page 1 of 1
DATED          : January 14, 2003
INVENTOR(S)    : Maceratini et al.

It is certified that error appears in the above-identified patent and that said Letters Patent is hereby corrected as shown below:

<u>Title page,</u>
Item [30], should read:
-- Foreign Application Priority Data
May 26, 2000          TO00A0488 --

Signed and Sealed this

Seventh Day of October, 2003

JAMES E. ROGAN
*Director of the United States Patent and Trademark Office*